June 1, 1943.  H. R. MOULTON  2,320,375
OPHTHALMIC MOUNTING AND METHOD OF MAKING THE SAME
Filed July 18, 1939
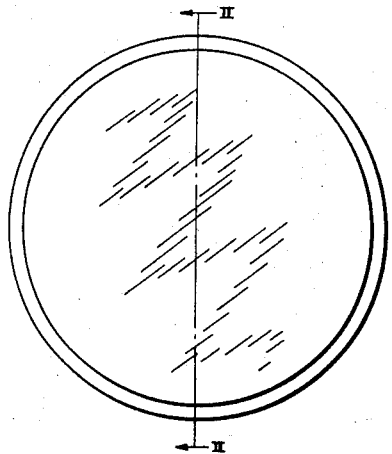
Fig. I
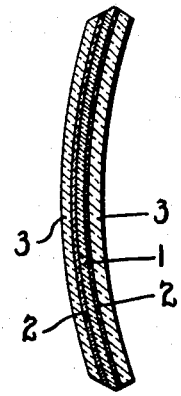
Fig. II
Fig. III
INVENTOR.
HAROLD R. MOULTON
BY Harry H. Styll
ATTORNEY.

Patented June 1, 1943

2,320,375

UNITED STATES PATENT OFFICE 2,320,375

OPHTHALMIC MOUNTING AND METHOD OF MAKING THE SAME

Harold R. Moulton, Southbridge, Mass., assignor to American Optical Company, Southbridge, Mass., a voluntary association of Massachusetts Application July 18, 1939, Serial No. 285,147

4 Claims. (Cl. 88—65)

This invention relates to improvements in laminated lenses and similar bodies and to new and improved processes for making the same.

A principal object of the invention is to provide a laminated lens or similar body comprising layers of different materials permanently united to withstand practical use without separation of the parts.

Another object of the invention is to provide a laminated lens or similar body comprising layers of different materials united by a bonding material between the layers that will unite and adhere to the surfaces of both materials whereby they may be permanently united for practical wear and use.

Another object of the invention is the provision in such a lens or body of bonding means that will not require edge sealing.

Another object of the invention is to provide a laminated light polarizing lens or similar body that retards the passage of heat rays into the eye as well as polarizes the light.

Another object is to provide such a light polarizing lens or body without altering substantially the color transmission of the lens over that of an ordinary polarizing lens.

Another object of the invention is to provide a new and improved process of securing the lamina of laminated lenses and similar bodies into permanent united association.

Another object of the invention is to provide improved processes for making laminated lenses and similar bodies of this nature with selected and desired optical properties.

Other objects and advantages of the invention will become apparent from the following description taken in conjunction with the accompanying drawing. It is apparent that various changes may be made in the details of construction, arrangement of parts, and the steps of the processes without departing from the spirit of the invention as expressed in the accompanying claims. The invention then should not be limited to the exact matters shown and described as the preferred forms have been shown and described by way of illustration only.

Referring to the drawing:

Fig. I is a front view of a lens embodying the invention;

Fig. II is a cross section on line II—II of Fig. I; and

Fig. III is an enlarged sectional cross section.

Lenses and similar bodies for polarizing light have been recently introduced into the art. They incorporate in their assembly a sheet of acetate film in which is imbedded minute light polarizing crystals with their axes arranged in parallelism.

This film has the property of polarizing light and also the property of absorbing a considerable amount of the ultra violet rays. This film unfortunately however has the property of allowing the transmission of practically all the infra red light. This is very objectionable and injurious because as the film cuts down the illumination the pupils of the eyes expand and are thus fully subjected to the heat rays, even to a much greater extent than with ordinary lenses and light transmitting bodies because of this expansion of the pupils.

Also absorption of the heat rays has usually introduced color and cut down the light transmission. It is therefore a principal object of my invention to avoid these difficulties to provide a polarizing body that eliminates most of the heat rays and does not change color or cut down light transmission. These are most important considerations.

Light polarizing bodies are made by placing a sheet of the acetate polarizing film between light transmitting layers and bonding the film to the layers on each side. This bonding has proven to be a most difficult thing to accomplish in a practical, wearable structure because the sheet and layers have separated and pulled apart in use. Discoloration and blisters and bubbles have also been present. The acetate film and its contained crystals are very sensitive and a bonding material has to be found that will not destroy this light polarizing material. Many various forms of commercial light polarizing medium were placed on the market and had to be returned because of defective bonding of the layers. The obtaining of a practical bonding medium has been difficult and has only been obtained as the result of costly research development work my me. A principal object of the invention, hence, is the avoiding of these difficulties and the obtaining of a practical bond that is permanent, will not discolor or blister or separate, and that does not have to be edge sealed. Other important advantages are the obtaining of properly bonded laminated bodies of all descriptions, the obtaining of laminated lenses or bodies to produce desired or required optical properties such as absorption of heat rays, ultra-violet rays, or any selected rays of the spectrum, the obtaining of desired color effects and light transmission and the prevention of glare, etc., and also the obtaining of laminated light transmitting bodies and properly bonded for protection from blows, flying objects or other hazards to the eye. The use of such bodies is widespread and of the first importance in the art. By securing the proper bonding, all these advantages are obtainable.

Referring to the drawing, in which like parts are indicated by like characters:

In the production of my laminated light polarizing lenses and bodies I start with a piece of the light polarizing film 1. This film 1 comprises a matrix of cellulose acetate having dispersed throughout its volume oriented dichroic crystals with their axes arranged to be parallel. These crystals are produced in very small size and they have the property of polarizing light in simple transmission. This film 1 is now commercially obtainable.

I next provide a bonding layer 2. For this purpose I preferably use vinylite X, which is a vinyl resin treated to produce a polyvinyl acetal. This is a fluffy powder. I mix this with a plasticizing agent which has the property of bonding it to the layer of film and to the light transmitting layer 3 between which it is placed. It does not injure the crystals of the film 1. Castor oil has been found to be very suitable for this purpose.

It is possible to incorporate the castor oil with this material by heating and mixing while hot and filtering the mass while hot and soft under high pressure. Oxygen must be kept out of this mixture.

The mixing operation is therefore carried out in a vacuum or an inert gas such as nitrogen, helium, etc. In the use of this material it was found that laminations made with it discolored around the edges, producing a yellowish tinge. To provide against this discoloration, about $\frac{1}{10}$ of 1% of deoxidant, preferably hydroquinone is incorporated at the time of mixing.

After the filtering operation is completed the material is extruded in warm condition through two slots somewhat wider than the film 1. The film 1 is fed in between the two streams of the extruded material. The material is thus deposited on the film 1 and pressed to cause it to bind to the film 1.

When thus applied to the film 1 the surfaces are then dusted with a powder to prevent sticking until it is used. This powder may be anhydrous sodium sulphate or powdered sodium bicarbonate.

The process of making the laminated lens is as follows:

The coated film 1 and the surfaces of the light transmitting layers 3 are cleansed with warm water of from 100 to 150° F., then in cool water of less than 80° F. Without drying, the layers are assembled in a stream of clean cool water. The assembled layers are placed in a press and heated to 225° F. to 275° F. The pressure may be increased by increments of from 25 to 75 pounds per square inch of area at fixed intervals approximating 20 to 40 seconds, or even more quickly, until a final pressure of from 250 to 350 pounds per square inch of surface is reached, and this final pressure is held for a time depending upon the thickness of the light transmitting layers 3, and upon the temperature. For thin layers 3, the time may be 30 seconds at 230° F. The purpose of the wet assembly is to avoid dirt and to aid in the removal of bubbles.

The light transmitting layers 3 may be of glass, of a plastic synthetic resinous light transmitting composition, or any light transmitting medium.

If I desire to make a curved lens or article as shown in Figs. I and II, the press used has the desired curvature. The necessary heat is applied in the press by electrical connections, or other means not shown. Both the amount of pressure and the heat are controlled in the press to desired units.

To provide the desired heat ray absorption I may use for the layers 3 a ferrous iron, silica, potash, soda, lime composition which has a blue to green shade, or if I desire a medium that is nearly colorless that does not cut down the light transmission materially, I may use a ferrous iron-phosphate composition with practically no silica in its composition. This composition will absorb the heat rays and is nearly colorless.

It is clear that I can make various combinations as regards the layers 3. Both layers 3 may be of the said blue green composition, both may be of the said nearly colorless composition. One layer may be of one composition and the other layer of the other. One layer may be of either of said compositions and the other layer of clear or any desired composition. Where a clear light transmitting medium is used as one of the layers, ingredients may be incorporated in its composition to introduce any desired color modification or any desired additional effect on the light transmission as far as these effects are now produceable in the commercial art, or suitable ingredients may be incorporated in either or both of the layers 2.

The process described for uniting the layers has decided advantages and improvements over the prior art. In the prior art the film lamina became separated from the light transmitting layers. Many commercial articles were returned to the manufacturers for this defect. It was impossible to make a curved body that would stay united. In my process the parts are permanently united and commercial curved bodies of fine quality are now being made and sold in the art. This method of uniting the parts in combination with the absorption of the heat rays is producing a commercial product of the highest quality.

It is clear that with laminated bodies bonded by my processes practical structures may be made for various optical and protection requirements. The film 1 has the property of absorbing ultra-violet rays. But development in the polarizing art may produce film of similar nature transmitting ultra-violet rays. Therefore it is desirable and possible to incorporate ultra-violet absorbing ingredients in the transparent layers 3 or in the bonding layers 2, or in any one or more of them. Glasses or light transmitting mediums for layers may be provided having chemical compositions to absorb or retard heat rays, or any desired rays of the spectrum. Desired color may be incorporated in the layers. Laminated bodies provide strong non-shatterable protection means for use before the eyes. These constructions may be made also for screens for camera and projection lens systems to cut down heat rays or to polarize light, or to obtain various optical results. Hitherto the bonding has been insufficient to provide articles of this nature that would stand up in service. A very important feature is that no edge sealing is required with this bond. The perfection of this invention makes possible the attainment of all the advantageous use of laminated articles in the art.

From the foregoing it will be seen that I have provided simple, efficient and economical means for obtaining all the advantages and objects of the invention.

Having described my invention, I claim:

1. A laminated non-glare safety plate comprising a pair of relatively thin sheets of light transmitting medium, a layer of polyvinyl acetal containing castor oil as a non-solvent plasticizer adherent to the inner face of each of said sheets of light transmitting medium and a relatively thin light polarizing sheet of cellulosic material intermediate the polyvinyl acetal layers and adhered thereto, the cellulosic material having disposed and embedded therein oriented dichroic crystals with their axes arranged parallel, said crystals having the property of polarizing light by simple transmission, said layers of polyvinyl acetal also containing a deoxidant having the characteristics of hydroquinone of an amount sufficient to stabilize said layers and provide against discoloration and injury to the polarizing sheet of the lamination.

2. A laminated plate of non-glare safety glass comprising a pair of glass sheets, a layer of polyvinyl acetal containing castor oil as a non-solvent plasticizer adherent to the inner face of each glass sheet and a relatively thin light polarizing sheet of cellulosic material intermediate the polyvinyl acetal layers and adhered thereto, the cellulosic material having disposed and embedded therein oriented dichroic crystals with their axes arranged parallel, said crystals having the property of polarizing light by simple transmission, said layers of polyvinyl acetal also containing hydroquinone of an amount sufficient to stabilize said layers and provide against discoloration and injury to the polarizing sheet of the lamination.

3. The process of making a light transmitting body comprising combining polyvinyl acetal with castor oil as a plasticizer of an amount sufficient to bring about a suitable bonding effect and with hydroquinone of a given amount, heating and mixing said combined ingredients in the absence of an oxidizing atmosphere to a temperature sufficient to render the mixture workable, applying a warm coating of said mixture to the opposed sides of a light polarizing sheet of cellulose acetate having oriented therein dichroic crystals with the axes in substantially parallel relation with each other, superimposing a layer of light transmitting medium on each of the coatings of said mixture and applying heat and pressure of an amount sufficient to cause said sheet and said layers to be adhesively joined by said coatings, said hydroquinone being of an amount sufficient to stabilize said coatings and provide against discoloration and injury to the light polarizing sheet.

4. The process of making a laminated light transmitting body comprising combining polyvinyl acetal with castor oil as a plasticizer of an amount sufficient to bring about a suitable bonding effect and with hydroquinone of a given amount, heating and mixing said combined ingredients in the absence of an oxidizing atmosphere to a temperature sufficient to render the mixture workable, applying a warm coating of said mixture to the opposed sides of a light polarizing sheet of cellulose acetate having oriented therein dichroic crystals with the axes in substantially parallel relation with each other, wetting said coatings with a liquid having the characteristics of water and superimposing a layer of light transmitting medium on each of the coatings of said mixture while wet to produce a substantially continuous film of said liquid between the coatings and the layers of light transmitting medium throughout the effective usable portion of the laminated light transmitting body, and applying heat and pressure of an amount sufficient to cause said polarizing sheet and said layers to be adhesively joined by said coatings, said hydroquinone being of an amount sufficient to stabilize said coatings and provide against discoloration and injury to the light polarizing sheet.

HAROLD R. MOULTON.